United States Patent [19]
Claflin et al.

[11] Patent Number: 5,729,668
[45] Date of Patent: Mar. 17, 1998

[54] OPTIMIZED HARDWARE COMPRESSION AND DECOMPRESSION ARCHITECTURE FOR USE BY AN IMAGE PROCESSOR IN A LASER PRINTER

[75] Inventors: Carrie Lee Claflin; Gary D. Zimmerman; Gregory Lonnon, all of Boise, Id.

[73] Assignee: Hewlett-Packard Company, Palo Alto, Calif.

[21] Appl. No.: 528,590

[22] Filed: Sep. 15, 1995

[51] Int. Cl.$^6$ .................................................. G06K 15/00
[52] U.S. Cl. ........................... 395/114; 395/112; 395/115
[58] Field of Search ..................................... 395/114, 115, 395/116, 501, 112, 101, 507, 509, 511, 512, 521; 358/426, 261.1, 261.2, 261.3, 427, 261.4, 430, 432, 444, 404, 431, 433, 262.1; 382/232; 345/202; 341/50, 87

[56] References Cited

U.S. PATENT DOCUMENTS

| | | | |
|---|---|---|---|
| 5,170,263 | 12/1992 | Hisatake et al. | 358/426 |
| 5,229,866 | 7/1993 | Kashiwagi et al. | 358/444 |
| 5,337,319 | 8/1994 | Furukawa et al. | 371/11.1 |
| 5,479,587 | 12/1995 | Campbell et al. | 395/114 |
| 5,513,301 | 4/1996 | Wakasu | 395/114 |
| 5,539,865 | 7/1996 | Gentile | 395/115 |
| 5,544,290 | 8/1996 | Gentile | 395/115 |
| 5,574,953 | 11/1996 | Rust et al. | 395/888 |

*Primary Examiner*—Edward L. Coles, Sr.
*Assistant Examiner*—Dov Popovici
*Attorney, Agent, or Firm*—Anthony J. Baca

[57] ABSTRACT

There is provided an apparatus for compressing data. The apparatus is constructed from a random access memory (RAM). Next, there is an input controller connected to the RAM. A compression unit and decompression unit are connected to the input controller. There is an output controller connected to the compression and decompression units and the RAM. Finally there is a controller connected to the RAM, the input and output controllers. The controller configures the input controller to retrieve input data from the RAM and transfers the retrieved data to an active unit, the active unit being the compression unit for compressing the original data into the compressed data or the decompression unit for decompressing the compressed data into the original data. Under direction of the controller, the output controller retrieves data from the active unit. Data from the output controller may be transferred to the RAM, to a printer, or just counted to determine the size of the data. Either input or output controller may independently be stopped. After the input or output controller is stopped, the controller may reconfigure the input controller or the output controller.

5 Claims, 9 Drawing Sheets

OPTIMIZED HARDWARE COMPRESSION AND DECOMPRESSION ARCHITECTURE FOR USE BY AN IMAGE PROCESSOR IN A LASER PRINTER

CROSS-REFERENCE TO RELATED APPLICATION

The present application is related to the following co-pending U.S. Patent Application being assigned to the same assignee, entitled: "A LOSSY DATA COMPRESSION METHOD", U.S. patent application Ser. No. 08/528,582, filed on Sep. 15, 1995, incorporated herein by reference.

TECHNICAL FIELD

The present invention relates to data compression and decompression, more particularly, to a data compression and decompression architecture implemented in hardware.

BACKGROUND OF THE INVENTION

Prior art page printers typically capture an entire page before any image is placed on paper. In such printers, formatting is either performed on the host computer, or on a formatter within the printer. Since a laser printer engine operates at a constant speed, if new rasterized data is not available at a rate that keeps up with the engines operation, a page "overrun" (also referred to as punt) occurs and the page is not printable.

To prevent print overruns, a variety of techniques are used. At first, a full raster bit map of an entire page was stored so that the print mechanism always had rasterized data awaiting action. Early laser printers, which printed at 300 dots per inch resolution, could use this technique because approximately 1 megabyte of raster memory for each page is used. However, with a 600 dot per inch printer, approximately 4 megabytes of memory are now required. Additionally, because laser printers achieve their rated speeds by pipelining of raster data, additional raster memory is needed to run the printer at its rated speed. Without the additional memory, composition of the subsequent page cannot begin until the present page has been printed. To remain cost competitive, substantial effort has been directed to reducing the amount of required memory in a laser printer.

One technique for memory reduction involves the construction of a page description language. A page description language is built in two steps: during formatting, data received from the host computer is converted into a list of simple commands, called display commands, which describe what must be printed. The second step prepares the display command list for printing and entails a parsing of the display commands and a rendering of the described objects into a raster bit map. This procedure requires a full page raster bit map memory because the same memory is used for succeeding pages.

A further refinement to the page description language helps reduce the amount of required memory by sorting the display command list procedure according to their vertical position on a page. The page is then divided into sections called page strips or "page intermediate" and each page strip is passed, sequentially, to the print engine for printing. When display commands within a page strip are rendered into rastered data at a fast enough pace, the same memory used to store a first page strip can be reused for subsequent page strips further down the page.

Presently, printer resolution has reached 600 dots per inch and beyond. Such printers handle not only text but also line art and various types of images. Many of these printers use general purpose data compression techniques to minimize the amount of memory required by the printer.

Data compression systems, which are known in the art, encode a stream of digital data signals into compressed digital code signals and decode the compressed digital code signals back into the original data. Data compression refers to any process that attempts to convert data in a given format into an alternative format requiring less space than the original. The objective of data compression systems is to effect a savings in the amount of storage required to hold a given body of digital information. When that digital information is a digital representation of an image or text, data compression systems are divided into two general types: lossy, and non-lossy.

The non-lossy systems have what is referred to as reciprocity. In order for the data compression system to possess the property of reciprocity it must be possible to re-expand or decode the compressed data back into its original form without any alteration or loss of information. The decoded and original data must be identical and indistinguishable with respect to each other. Thus, the property of reciprocity is synonymous to that of strict noiselessness used in information theory.

Some applications do not require strict adherence to the property of reciprocity. As stated above, one such application in particular, is when dealing with graphical data. Because the human eye is not sensitive to noise, some alteration or loss of information during the compression decompression process is acceptable. This loss of information gives the lossy data compression systems their name.

An important criteria in the design of data compression systems is the compression effectiveness, which is characterized by the compression ratio. The compression ratio is the ratio of data size in uncompressed form divided by the size in compressed in form. In order for data to be compressible the data must contain redundancy. Compression effectiveness is determined by how effectively the compression procedure uses the redundancy in the inputting data. In typical computer stored data, redundancy occurs both in the non-uniform usage of individual symbology, example digits, bytes, or characters, and in frequent reoccurrence of symbol sequences, such as common words, blank record fields and the like.

The data compression system should provide sufficient performance with respect to the data rates provided by and accepted by the printer. The rate at which data can be compressed is determined by the input data processing rate of the compression system. Sufficient performance is necessary to maintain the data rates achieved, thereby not allowing a "page punt" because the laser is starved for data. Thus, the data compression and decompression system must have enough data band width so as not to adversely effect the overall system.

Typically, the performance of data compression and decompression systems is limited by the computations necessary to compress and decompress and the speed of the system components such as random access memory and the like, utilized to store statistical data and guide the compression process. This is particularly true when the compression and decompression systems are implemented in firmware, wherein firmware guides a general purpose type central processing unit to perform the data compression decompression process. In such a system, performance for a compression device is characterized by the number of processor cycles required per input character during compression. The fewer the number of cycles, the higher the performance. The firmware solutions were limited by the speed of the firmware compression and decompression because firmware took several central processor unit cycles to decompress each byte. Thus, the firmware process generally was tailored to decrease compression ratios in order to increase decompression speed.

General purpose data compression procedures are known in the prior art; three relevant procedures being the Huffman method, the Tunstall method and the Lempel-Ziv method. One of the first general purpose data compression procedures developed is the Huffman method. Briefly described, the Huffman method maps full length segments of symbols into variable length words. The Tunstall method, which maps variable length segments of symbols into fixed length binary words, is complimentary to the Huffman procedure. Like the Huffman procedure, the Tunstall procedure requires a foreknowledge of the source data probabilities. Again this fore knowledge requirement can be satisfied to some degree by utilizing an adaptive version which accumulates the statistic strength processing of the data.

The Lempel-Ziv procedure maps variable length segments of symbols into variable length binary words. It is asymptotically optimal when there are no constraints on the input or output segments. In this procedure the input data string is parsed into adaptively grown segments. Each segments consisting of an exact copy of an earlier portion of the input string suffixed by one new symbol from the input data. The copy which is to be made is the longest possible and is not constrained to coincide with an earlier parsed segment. The code word which represents the segment in the output contains information consisting of a pointer to where there earlier copy portions begin, the length of the code, and the new symbol. Additional teaching for the Lempel-Ziv data compression technique can be found in the U.S. Pat. No. 4,558,302 incorporated herein by reference.

While the aforementioned data compression procedures are good general purpose lossless procedures, some specific types of redundancy may be compressed using other methods. One such lossless method commonly known as run length encoding (RLE), is well suited for graphical image data. With RLE, sequences of individual characters can be encoded as a count field plus an identifier of the repeated character. Typically, two characters are needed to mark each character run, so that this encoding would not be used for runs of two or fewer characters. However, when dealing with a graphical image represented in digital data form, there can be large runs of the same character in any given line making RLE an effective compression procedure for such information.

Given a 600 DPI Laser Printer with 1 megabyte of ram as a base configuration, many text pages along with more complex graphics pages may cause memory low conditions in the firmware. For these memory starved printers, some form of data compression must be used. One of the requirements for the compression and decompression system is that the decompressed data must be delivered to the laser in real time. That is, once the page printing process begins, the engine cannot be stopped. Thus the compression and decompression system for these memory starved printers need fast image compression and decompression along with high compression ratios to help print pages at full engine speed.

Previous solutions implemented in firmware were limited by the speed of firmware decompression since firmware decompression took many microprocessor cycles to decompress each byte. These firmware algorithms used in previous products were tailored to meet the strengths and weaknesses of firmware compression decompression. Thus, in a tradeoff, the firmware algorithms are tailored to increase decompression speed while sacrificing the compression ratio.

Firmware based compression algorithms used in previous products separated the image into horizontal blocks and compressed each block individually. This was done to minimize the size of continuous physical memory needed to store an image. For example, in the Laser Jet 4L printer, manufactured by the assignee of this application, images were compressed into 16 row high compressed blocks. However, breaking an image up into numerous blocks decreases the compression ratio because compressing an image in a single block causes more efficient compression by giving the compression algorithm more data to work with. During memory low conditions, non-contiguous memory may need to be used because the largest free memory block in a system is too small to satisfy the existing memory request.

Previous hardware solutions to the non contiguous memory problem used special link literal in the compressed data stream to communicate to the decompression machine when one fragment of data ended and where the next began. The same solution also used a special EOF literal in the compressed data stream to communicate to the decompression machine when the entire block was finished. See U.S. Pat. No. 5,574,953, issued on Nov. 12, 1996, titled: "Storing Compressed Data In Non-Contiguous Memory", assigned to the same assignees as the present application. This scheme decreases the compression ratio because it requires that unique tokens be defined which could not be later be used by the compression algorithm.

Another advantage of storing the compressed image in several horizontal blocks allows the image processor to gain access to any particular block in an expedited manner, without having to decompress the entire image. This was particularly useful in the rendering process where most of the compressed image was not needed. The image processor first finds the first block that contains the needed data appearing below the block of unneeded area and decompresses the rest of the blocks needed to reconstruct the needed portion of the image. Again, as mentioned above, this method compromised the compression ratios, because the entire image was not compressed into a single block, in exchange for the speed gained by not having to decompress parts of the image that were not needed.

Finally, prior to the present invention, there was no quick way of predicting the compressed size of the input data. Allowing for prediction of the image compression size allows the image processor to use less temporary buffers, make decisions on compression methods quickly, and increase the overall compressor speed.

The image processor is responsible for rendering an intermediate representation of a page into horizontal strips of a page suitable to be sent to the laser. The intermediate representation of the page may be a high level page description language such as PCL or post script. Each page's description contains imaging instructions to render itself. The instructions usually require that the image processor clip the top and or bottom of image data in order to break the page into horizontal strips for printing. An example of horizontal strip buffering can be seen in FIG. 1. For exemplary purposes, three strips 103, 104, and 105 are shown in FIG. 1, also shown are two characters 101 and 102. In a normal application, each strip has a width equal to the destination media. However, for clarity during this discussion, the strips are shown in a magnified format. Character 101 is continued from the strip rendered prior to strip 103. Because of the size of character 101, it also extends into strip 104. In a similar manner, character 102 is present in strips 104, 105 and the strip subsequent to 105. Thus, for the image processor to properly render both characters 101 and 102, portions of these characters must be clipped. For example, when rendering strip 103, a small portion on the top of character 101 must be clipped because it is not present in strip 103. The lower portion of character 101, which is also not present in 103, must also be clipped. As the image processor starts rendering strip 104, character 101 must have its top portion clipped. Only a portion of character 102 is present in strip 104. Finally, strip 105 requires the top portion of character 102 to be clipped along with a small bottom portion extending into the next strip. Extrapolating this to the normal situation where a strip has a width equal to the media width, it is possible that the image processor may need to clip hundreds of characters during the rendering of a single strip.

Rendering a final image from the intermediate description can be very memory and real time intensive depending upon the complexity of the strip. Therefore, compression techniques have been introduced into printers in order to both limit the amount of memory needed by the system in typical cases and increase the number of pages which can be printed with a given amount of physical memory. The task of clipping is performed by the image processor for potentially a large number of characters is further complicated by the fact that to reduce memory consumption, these font characters are stored in a compressed format. Therefore, the image processor must both clip and decompress the font information during the rendering process. Both of these operations must be performed with sufficient throughput as not to cause a "print overrun".

Prior to the present invention, to help reduce the real time burden on the image processor, the individual characters of the font are divided along a horizontal line where each resident portion between two division lines are independently compressed. An example of such division can be seen in FIG. 2. By dividing the compressed image into pieces along the vertical axis, the image processor does not need to decompress the entire image when rendering only a portion of it. For example, referring to FIG. 1, when rendering strip 104, the image processor first must clip the top portion of the element 101. While it is possible that the image processor could completely decompress element 101, this presents a significant real time burden for the image processor. Using the idea as shown in FIG. 2, the image processor may actually start decompressing element 101 at line 110G. In doing so, the image processor must then only discard a small portion which lies below line 110G but is not to be rendered into strip 104 of FIG. 1. Similarly, when the image processor starts rendering character 102, it can begin decompressing character 102 at line 110D and stop decompression at line 110G.

Dividing characters along a vertical axis to facilitate easier clipping by the image processor tends to reduce the compression ratio for the individual characters as noted above. Thus, prior compression techniques limited either the compression ratio which could be obtained or the flexibility and therefore speed of the image processor.

SUMMARY OF THE INVENTION

In order to accomplish the present invention there is provided an apparatus for compressing an original data into a compressed data. The apparatus also decompresses the compressed data back into the original data. The apparatus is constructed from a random access memory (RAM) used for storing the original data and other information. Next, there is an input controller connected to the RAM. A compression unit and decompression unit are connected to the input controller. There is an output controller connected to the compression and decompression units and the RAM. Finally there is a controller connected to the RAM, the input and output controllers, and the compression and decompression units.

The controller configures the input controller to retrieve input data from the RAM and transfers the retrieved data to an active unit, the active unit being the compression unit for compressing the original data into the compressed data or the decompression unit for decompressing the compressed data into the original data. The controller determines which unit is the active unit. Under direction of the controller, the output controller retrieves data from the active unit. Data from the output controller may be transferred to the RAM, to a printer, or counted to determine the size of the data.

The input controller receives a start compression indication and a start decompression from the controller. Upon receiving the start compression indication the input controller makes the compression unit the active unit. Similarly, upon receiving the start decompression indication, the input controller makes the decompression unit the active unit. The input controller also receives an input buffer count from the controller, which indicates a number of input data bytes to retrieve from the random access memory. When the input controller completes retrieving the number, the input controller signals the controller. After the controller receives the signal it may reconfigure the input controller. In a similar manner, when the output controller is stopped, the controller may reconfigure it.

BRIEF DESCRIPTION OF THE DRAWINGS

A better understanding of the invention may be had from the consideration of the following detailed description taken in conjunction with the accompanying drawings in which.

DETAILED DESCRIPTION OF THE PREFERRED EMBODIMENTS

The present invention is not limited to a specific embodiment illustrated herein. The preferred embodiment of the present invention provides for real time decompression and simultaneous clipping. Thus, the compressor may compress an entire character into a single block. The present invention uses a hardware compression architecture that gives the image processor the flexibility to crop images at will, store images in non-contiguous memory, predict compression sizes quickly, all without compromising the compression ratio.

Figure 1:
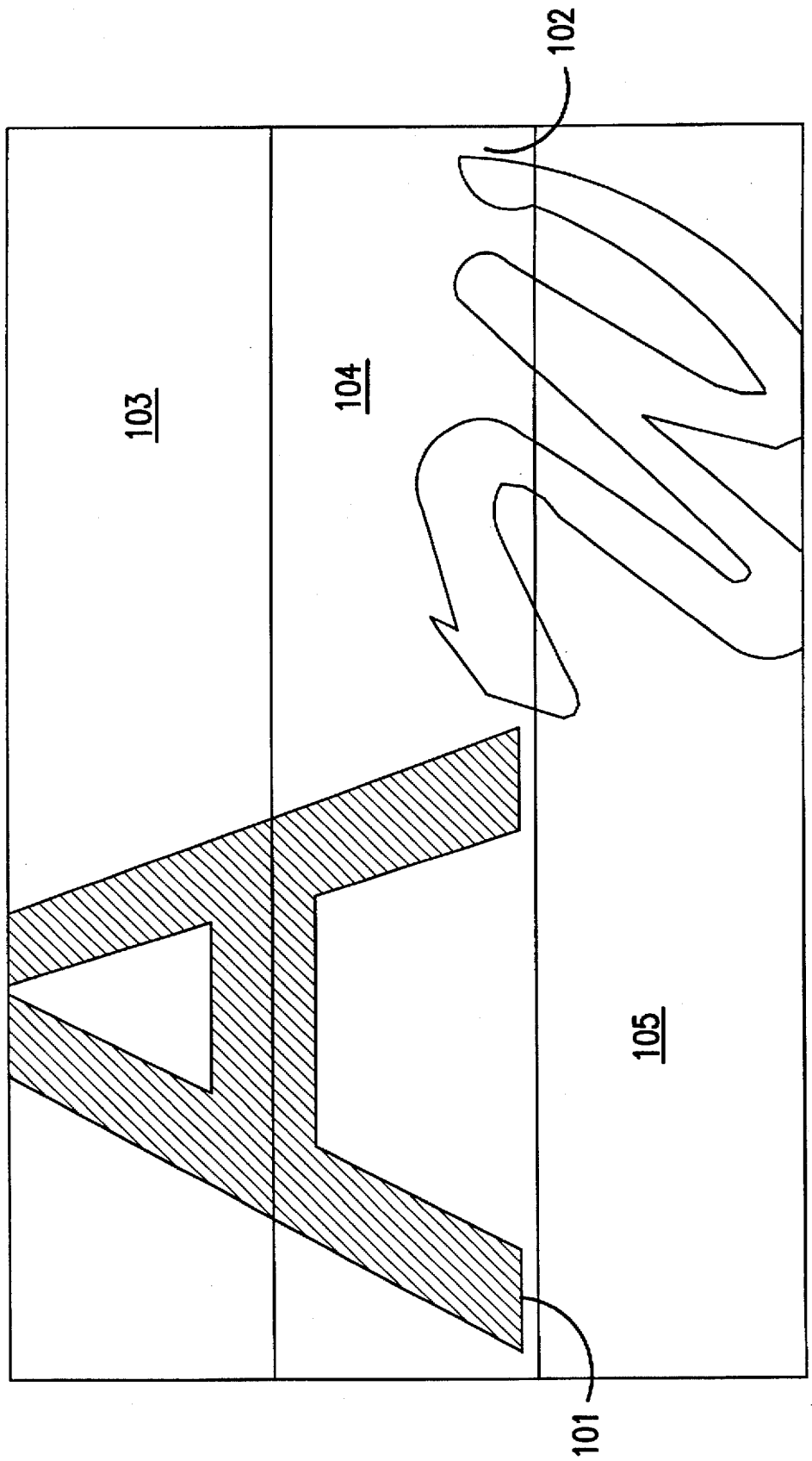
FIG. 1 shows characters being rendered into strip buffers.
Figure 2:
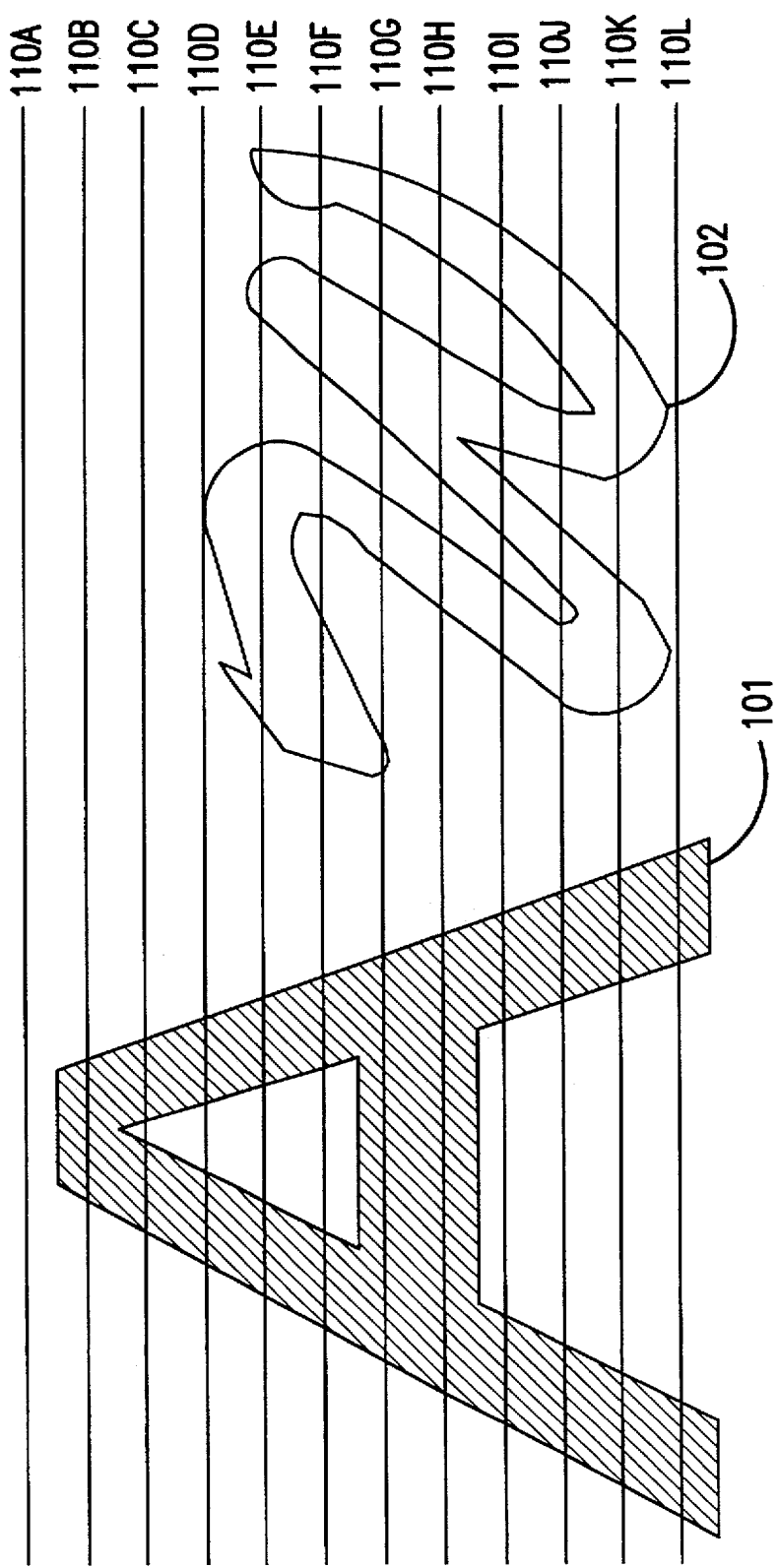
FIG. 2 shows vertical division of the two characters used in FIG. 1.
Figure 3:
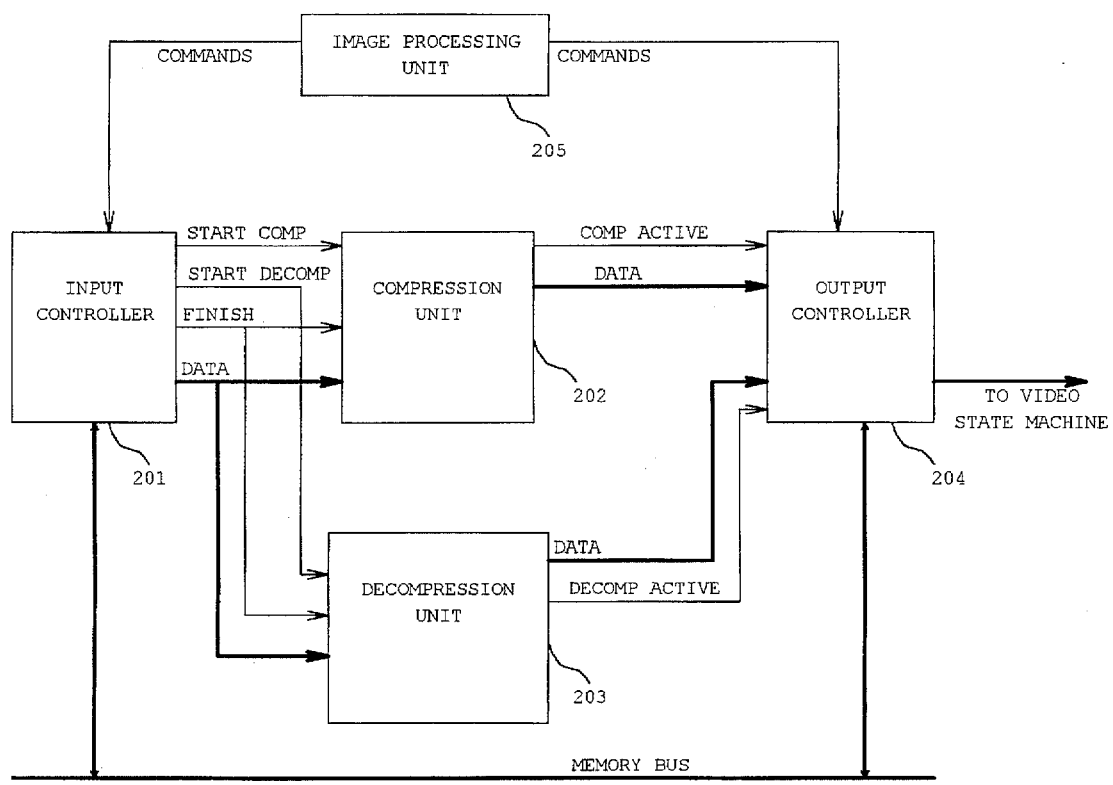
FIG. 3 is a block diagram of the preferred embodiment of the hardware compressor and decompressor architecture (HWC) in accordance with the present invention.

Referring now to FIG. 3 where a block diagram of the hardware compressor decompressor unit is shown. Input controller 201 connects to the physical memory interface (i.e., memory bus). In essence the input controller 201 has direct memory access (DMA) to the physical memory. Input controller 201 also receives commands from the central processing unit of the image processor 205. In the preferred embodiment of the present invention these commands consist essentially of: START COMPRESSION, START DECOMPRESSION, INPUT BUFFER LENGTH, INPUT BUFFER ADDRESS, CONTINUE, and INPUT IMAGE DONE. As will be described in greater detail subsequently, the input controller 201 provides the interface between the compression unit 202 or decompression unit 203 and physical memory. Data retrieved from physical memory passes through input controller 201 where it is transferred to either compression unit 202 or decompression unit 203 depending upon the mode of operation.

Compression unit 202 receives a plurality of commands from the input controller 201. These commands in the preferred embodiment consist of: START COMPRESSION, and FINISH. In a similar manner a decompression unit 203 receives analogous commands from the input controller 201. Data output from the compression unit 202 and decompression unit 203 are routed to the output controller 204. Output controller 204 also receives various commands from the image processing unit 205. In the preferred embodiment these commands consist of: MAXIMUM COUNT, OUTPUT BUFFER ADDRESS, BIT BUCKET DATA, VIDEO ON THE FLY, and STOP. Output controller 204 routes the data received from compression unit 202 or decompression unit 203 to either the physical memory, bit bucket, or the video state machine.

Thus, with the architecture of FIG. 3, the hardware compression unit (also referred to as HWC) can be programmed to independently stop the input controller 201 or output controller 204 using the INPUT BUFFER LENGTH and MAXIMUM COUNT commands respectively. After the HWC stops, the image processor unit can continue the current HWC mode of operation (compression, decompression, bit bucketing, output data), the current mode can be changed and then continued, or the HWC can finish and stop.

During compression or decompression of data the HWC can be programmed to switch input and output buffers based upon input or output byte counters. To change a buffer, the input or output controller is stopped at a programmed byte count, while it is stopped the image processor may change the input or output addresses. When the input or output controller is restarted, it uses the new addresses for reading or writing of data. Switching input and output buffers allow the HWC unit to use multiple memory buffers, which may be non-contiguous, for both input and output during compressing or decompressing data.

The compression unit 202 or decompression unit 203 can continue compressing or decompressing after the image processor unit stops the input controller 201 or output controller 204. The compression and decompressions algorithms are not affected by the stopping and continuing. Also, while the HWC is compressing or decompressing data the output does not need to be written to the physical memory. This HWC feature (herein referred to as bit bucketing) increases the HWC's speed and allows for quick determination of an imaged compression or decompressed size.

The compression and decompression units 202 and 203 respectively operate in similar manners to other hardware implementations of the compression techniques used. However, to operate in the present environment additional features are necessary for proper operation. First, each of these units should start to process data when it receives the appropriate start command from the input controller. If the flow of input data is interrupted, these units must wait for another byte or the finish flag. If this flag is set, the units finishes processing the available data and give the result to the output controller to process. Finally, when these units are idle, they assert the not active signal. One skilled in the art would be able to make such modifications to currently known hardware implementations without undue experimentation.

Figure 4:
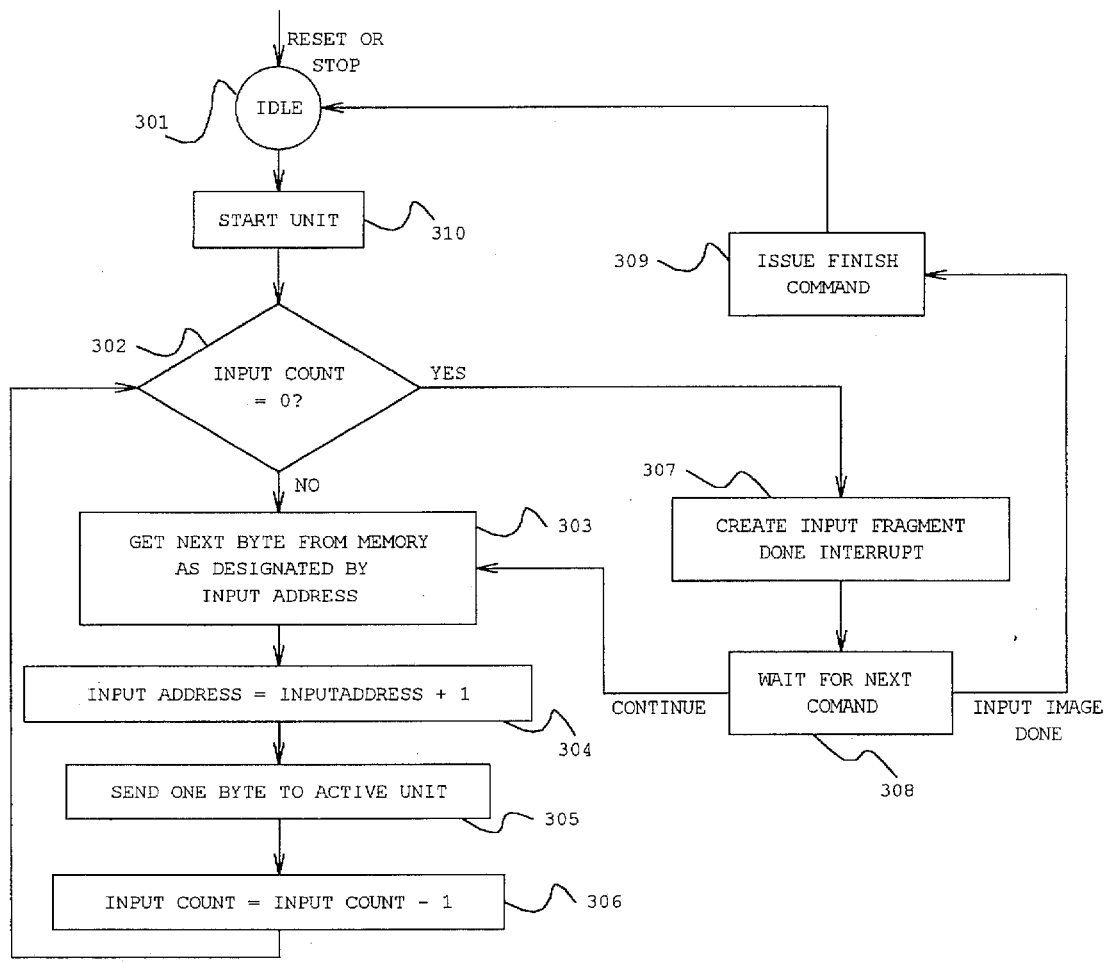
FIG. 4 is a logical flow diagram for the input controller.

Referring now to FIG. 4, where a flow diagram of the input controller is shown. First, the image processor unit sets up the input address and the input count with the location and length of the first block in the image. Next, the image processor unit sends either the start compression command or start decompression command 301. The appropriate unit is activated 310 by asserting either the start compression or start decompression signal. Next, the input controller checks to see if input count equals zero 302. Assuming the input count is not equal to zero, the input controller brings in a byte from physical memory as designated by the input address 303. The input counter is decremented 304 each time a byte is sent to the active machine 305. Additionally, the input address is incremented to allow retrieval of the next input byte 304. Eventually, the input count equals zero indicating that all bytes in the present input block have been sent to the active machine 302. The input controller signals the completion of the block by interrupting the image processor unit with an input fragment done interrupt 307.

If the needed part of the image has not been completely processed then the image processor unit programs the new location and length of the next block of the image into the input address and input count respectively. Next, the image processor unit issues a start command to continue at next address and the input controller resumes at 303. Alternatively, if there is no more data to be processed, the image processor unit then relates this information to the input controller by issuing the input image done command. The input controller then sets the finish flag 309 signaling the compression or decompression unit to finish the current code it is working on with the data already presented. The input controller deactivates the unit and returns to the idle state 310 waiting for another start command. One skilled in the art will notice that as shown, the input machine isolates the compression unit and decompression unit and the output machine from any knowledge about whether the input image has been fragmented.

Figure 5:
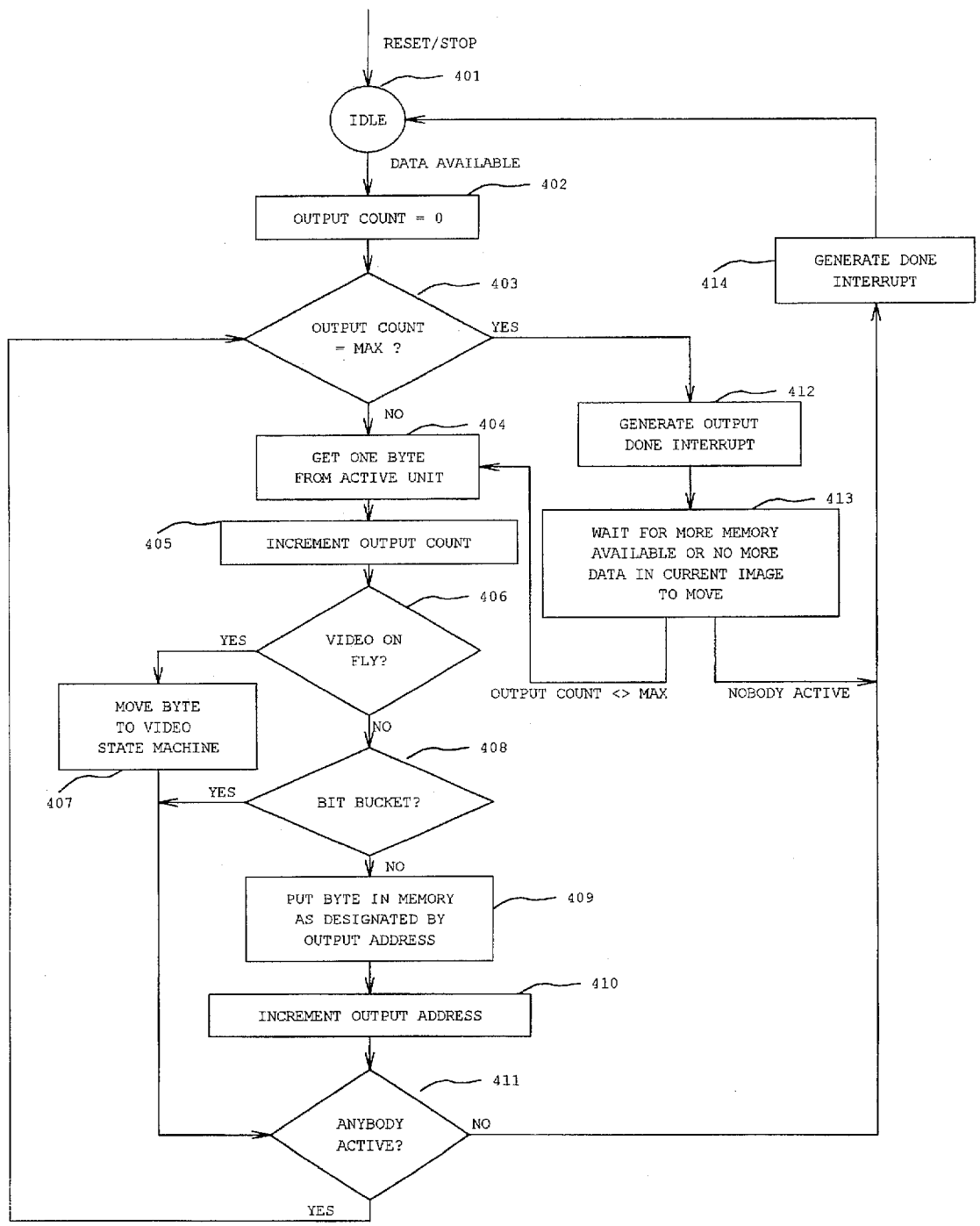
FIG. 5 is a logical flow diagram for the output controller.

Referring now to FIG. 5 where a flow diagram for the output controller is shown. The output controller is responsible for moving data on the active compression or decompression machine to physical memory. The output controller allows the image processor to crop both the beginning and end of an image, quickly calculate the size of a compressed block, and fragment the output of a compression or decompression into as small and as many fragments as necessary.

The output controller begins operation when the active compression or decompression machine (202 or 203 in FIG.

3) has its first byte ready. First, the output controller sets the output count to zero 402. Next, the byte is retrieved from the active unit 404. For each byte received, the output count is incremented 405. Next, the output controller performs one of three functions. First, if the video on fly flag is set, 406 the data is then moved to the video state machine as it requests it 407. Second, if the bit bucket flag is set, 408 the output controller does nothing with the data once it has signaled the active compression or decompression unit that it has retrieved it. Third, if neither one of these flags are set then the output controller moves the data to physical memory at the location pointed to by the output address 409. For each byte that is stored in the physical memory, the output address must be incremented 410. Next, a check is made to see if either unit is still active 411. Assuming one unit is still active, control is looped back up to 403 where the output count is compared against the max. count.

At some point, output count equals max. count. On the occurrence of this event, the output controller produces an output done interrupt 412. The output controller then waits until the max. count value is increased 413. This signals that the output should again begin transferring data. If, in the alternative the active unit transitions into a non-active state, then the output controller produces a done interrupt 414 and waits in the idle state 401 for the next operation.

The operation of the output controller depends upon the function that the image processor needs to perform. The three most often used functions include cropping to the beginning of an image, fragmenting the output image, and quickly calculating the size of a compressed block. To crop to the beginning of an image, the image processor first sets the bit bucket flag and sets the max. count value to the amount of the image it needs cropped before issuing the start command. Note, the output address value is irrelevant at this point. When the image processor receives the output done interrupt, it continues to process the rest of the image as desired. For instance, the image processor may fragment the rest of the output image or fragment part of it and crop the last part.

To fragment an output image the processor must first initialize the value in the output address. If the block in question is the beginning of the output image, then the image processor needs to initialize the output address before it issues the start command. The image processor then sets the max. count value to the current output count plus the length of the requested output fragment. When the image processor receives the output done interrupt it can continue to fragment the output data by setting the output address to the new location in memory and again setting the max. count value to the current output count plus the length of the requested output fragment.

To quickly calculate the size of a compressed block, the image processor first sets the bit bucket flag and then sets max. count value to its maximum value. In this application, the maximum value may be larger than the amount of physical memory available. Note, the output address value is irrelevant at this point. The image processor then issues the start command. When the image processor receives the done interrupt, the value in the output count reflects what the length of the resulting compressed image will be. In this way, the image processor can make decisions on how and where to store the image. For instance, it is possible, although unlikely, that a compressed image may be bigger than the original image. In this case it does not make sense for the image processor to store that particular image in its compressed form.

Figure 6:
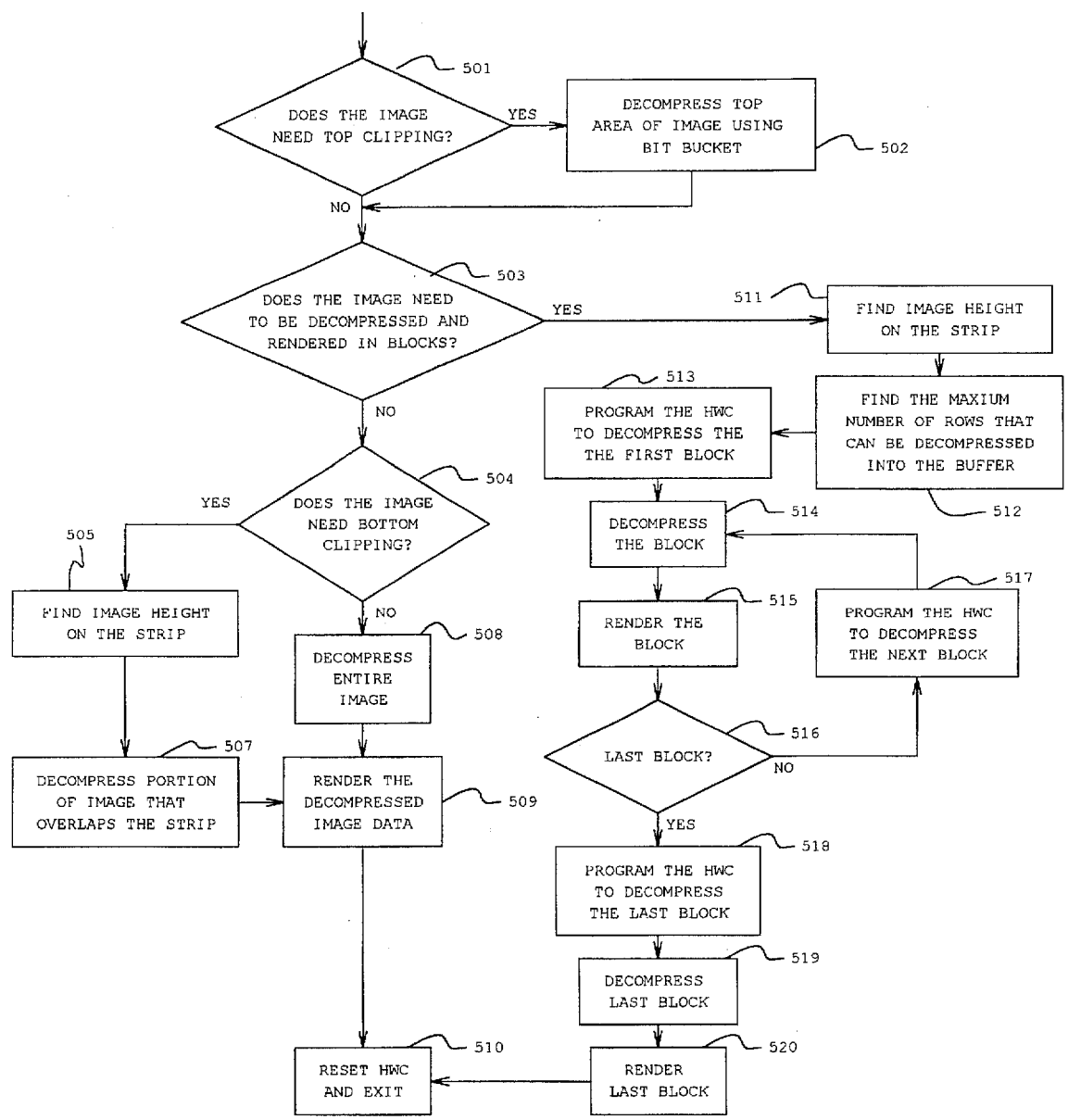
FIG. 6 is a logical flow diagram for the decompression process used by the architecture of FIG. 3.

In FIG. 6 a flow diagram illustrates the logical flow used for decompressing images. As stated before, the entire image is compressed into a single logical block. The HWC clips the top portion of the compressed image by "bit bucketing" the output data for the top of the image. The bit bucketing of data is needed to obtain current compression information at the start of the image on the strip and increases the decompression speed. The next step is decompressing and rendering the image on the current strip. The decompressing and rendering can occur at once or in blocks depending on the image size on the strip.

With renewed reference to FIG. 6, first a decision is made whether the image needs top clipping 501. In those cases where top clipping is necessary, the top is decompressed using the bit bucket and program the HWC to stop at the end of the top clip 502. Next, it is determined if the image needs to be decompressed into blocks 503. For those images that are not to be decompressed into blocks, the next decision is whether the image needs to have the bottom clipped 504. Assuming the entire image is to be decompressed 508, it is rendered and decompressed into the image data 509 and the HWC is reset and exited 510. In the alternative if a bottom region needs to be clipped, first the image height of the strip must be found 505. Next, that portion of the image that overlaps the strip is decompressed 507. Finally, the image data is decompressed and rendered in 509.

If the decompressed data needs to be rendered in blocks 503, then first the image height of the strip must be found 511. Given the maximum number of rows that can be decompressed into the temporary buffer 512, the HWC is programmed to decompress the first block 513. A block is decompressed 514 and rendered 514. A check is made to determine if the last block has been processed. The HWC continues processing blocks 517, 514, 515 until all blocks are processed 516. For the last block, the HWC is programmed to decompress it 518. And finally, the last block is rendered 520.

By manipulating the input and output controllers, the HWC can efficiently operate in non-contiguous memory. The non-contiguous memory is used under low memory conditions, by chaining of memory allocations. By allocating and using smaller chunks of memory, the system increases its ability to operate in low memory conditions.

Figure 7:
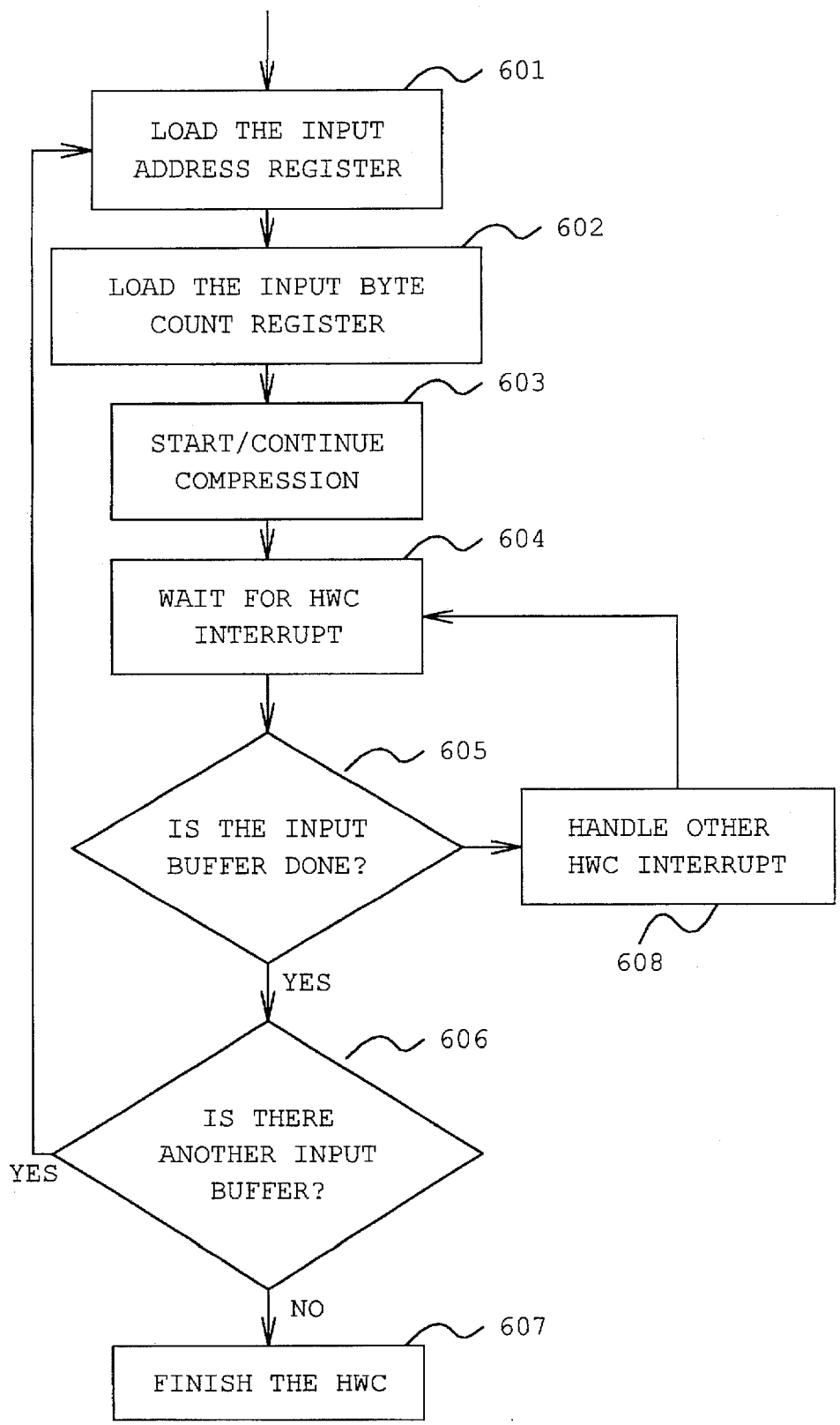
FIG. 7 is a logical flow diagram describing operation of the HWC for non-contiguous input.
Figure 8:
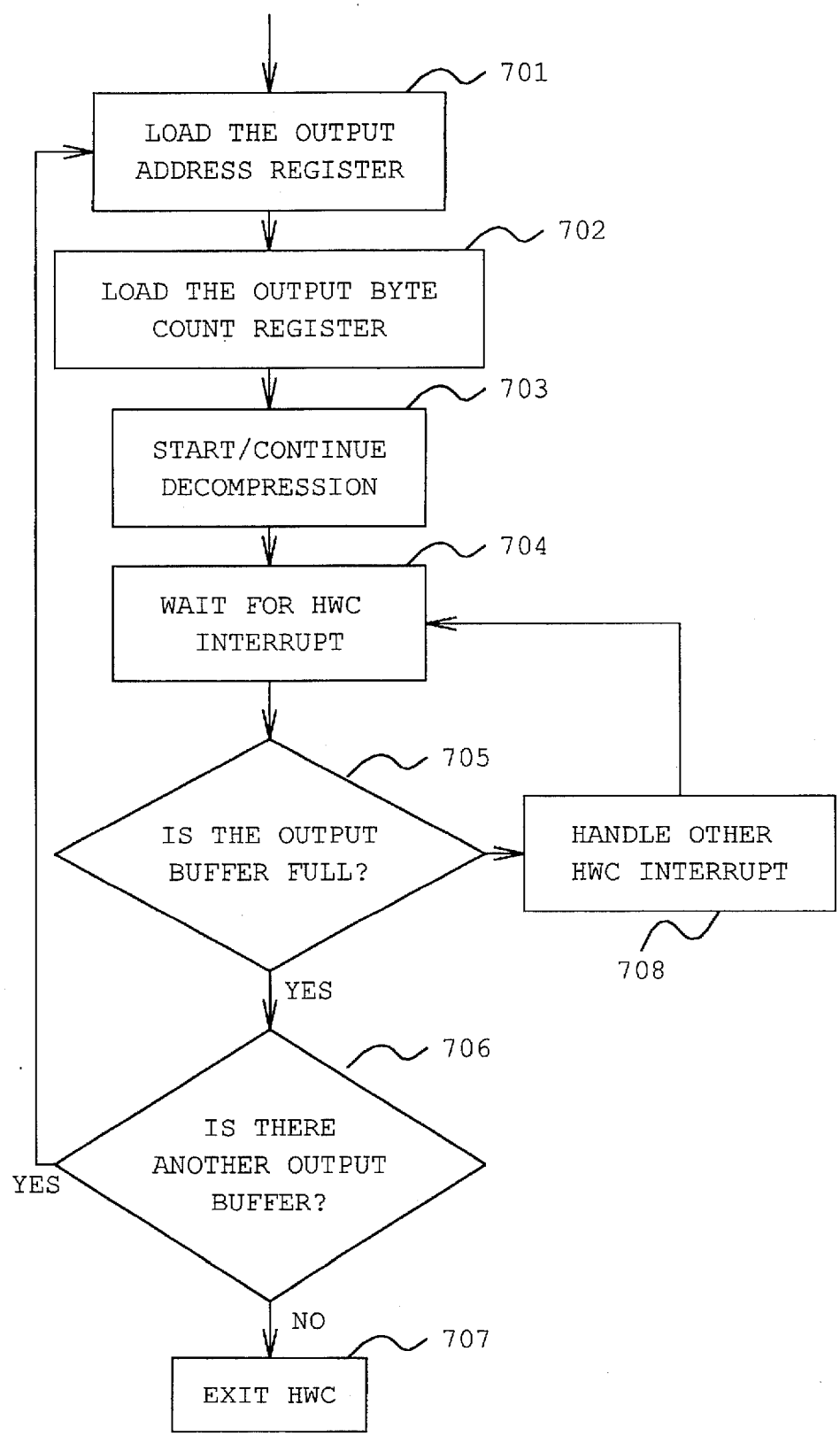
FIG. 8 is a logical flow diagram describing operation of the HWC for non-contiguous output.

The method used to control the HWC relies on the ability of the HWC to stop and continue on byte boundaries. Using the stopping and continuing functions of the HWC, it can be programmed to take input from a non-contiguous source or output to a non-contiguous destination. Referring now to FIG. 7, where a flow chart for non-contiguous input is shown. For non-contiguous input, first the image processor must load the input address register 601. Next, the input byte count register is also loaded 602. A start command is issued to the HWC. Once the HWC had processed all of the input information, an interrupt is generated 604. Assuming the buffer is done 605 a check is made to determine if another section of data needs to be processed 606. For each additional input buffer, the input address register 601 and input byte count register 602 must be updated appropriately. A continue command is then sent to the HWC 603. Eventually all of the input buffers have been processed and the input image done command is sent to the HWC 607. The flow chart of FIG. 8 illustrates control for non-contiguous output. Because of the similarity between non-contiguous output control and non-contiguous input control as described above, the flow chart of FIG. 8 will not be described in detail.

Figure 9:
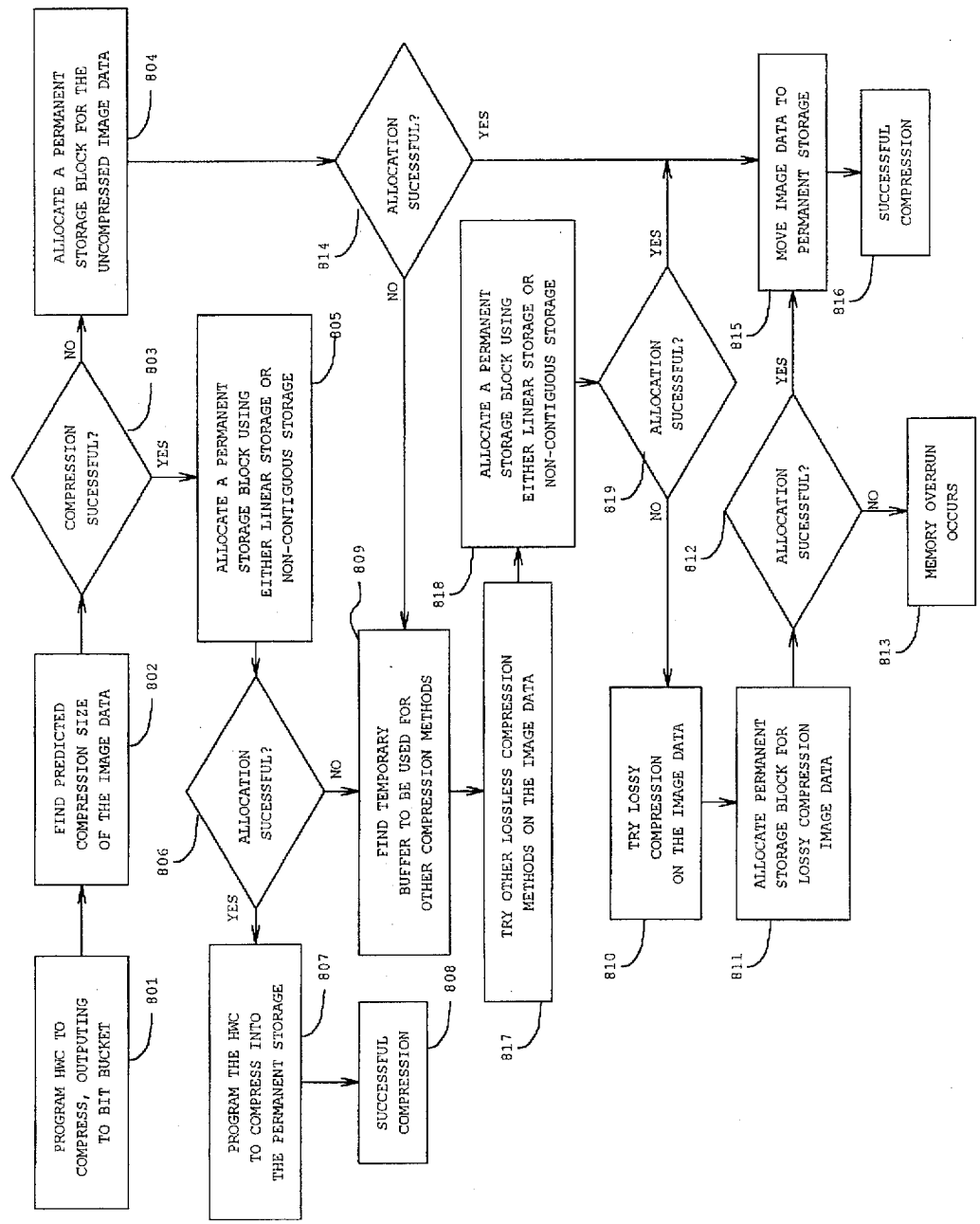
FIG. 9 is a logical flow diagram showing one possible embodiment for use of the compression size prediction function of the present invention.

FIG. 9 is a flow diagram showing the preferred embodiment of how predicting compression size may be used in a printing system. First, in 801 the HWC is programmed to compress the image data using the bit bucket for output. After Receiving the interrupt from the HWC the predicted compression size is retrieved 802. If the compression is successful 803, a permanent storage block using either linear storage or non-contiguous storage as allocated 805. If the allocation is successful 806, the HWC is programmed to compress the image data into the permanent storage 807.

If the original compression was not successful 803 then an attempt to allocate permanent storage block for the uncompressed image data is performed 804. If that allocation is successful 814 then the image data in an uncompressed format is moved the permanent storage 815. If the allocation is unsuccessful, meaning that the image data cannot fit in the available memory, then a temporary buffer is used for other compression methods 817. For example, a firmware lossless compression may prove to be more efficient for a given type of data. After each lossless attempt an attempt to allocate storage is made 818. If any lossless compression allocation is successful 819, then the lossless compressed data is moved into the permanent storage 815.

For data that does not compress sufficiently using lossless methods, a lossy method may prove successful. For a discussion of the lossy compression see co-pending Patent Application "A LOSSY DATA COMPRESSION METHOD", U.S. patent application Ser. No. 08/528,582, filed on Sep. 15, 1995. The lossy compression of the image data is performed 810. Based upon the allocation required for the lossy compressed data image 811, another allocation is requested 812. Upon a successful allocation, the lossy compressed image data is moved into the permanent storage 815. Finally, if the allocation for lossy compressed data is unsuccessful than a memory overrun occurs 813 and the page is unprintable.

Although the preferred embodiment of the invention has been illustrated, and that form described, it is readily apparent to those skilled in the art that various modifications may be made therein without departing from the spirit of the invention or from the scope of the appended claims.

What is claimed is:

1. An apparatus for compressing an original data into a compressed data, said apparatus further arranged to decompress said compressed data into said original data, said apparatus comprising:

a random access memory, said original data being stored in said random access memory;

an output controller connected to said random access memory;

a compression unit connect to said output controller;

a decompression unit connect to said output controller;

an input controller connected to said compression unit and said decompression unit and said random access memory, said input controller arranged to receive a start compression indication and a start decompression indication from a controller means, upon receiving said start compression indication, said input controller making said compression unit an active unit, upon receiving said start decompression indication, said input controller making said decompression unit said active unit, said input controller arranged to receive an input buffer count from said controller means, said input buffer count indicates to said input controller a number of input data to retrieve from said random access memory, when said input controller completes retrieving said number, said input controller signals said controller means that said number were retrieved; and said controller means connected to said random access memory, said input controller, and said output controller, said controller means for controlling said input controller to retrieve input data from said random access memory and transfer said retrieved data to said active unit, said controller means determining which unit is said active unit, said controller means controls said output controller to retrieve output data from said active unit, said active unit being said compression unit for compressing said original data into said compressed data and said active unit being said decompression unit for decompressing said compressed data into said original data.

2. The apparatus of claim 1 wherein when said controller means receives the signal from said input controller, said controller means reconfigures said input controller and sends a continue command to said input controller.

3. The apparatus of claim 1 wherein when said controller means receives the signal from said input controller, said controller means sends an input done command to said input controller, upon receiving said input done command said input controller sends a finish signal to said active unit and then deactivates said active unit.

4. The apparatus of claim 1 wherein said output controller arranged to receive a maximum count from said controller means, said maximum count indicates to said output controller a maximum number of output data to retrieve from said active unit, when said output controller completes retrieving said maximum number, said output controller signals said controller means that said maximum number were retrieved.

5. The apparatus of claim 4 wherein when said controller means receives the signal from said output controller, said controller means reconfigures said output controller and increases said maximum count.

* * * * *